May 2, 1967 F. A. GUERTH 3,317,742

PULSE GENERATING APPARATUS

Filed Jan. 30, 1963 2 Sheets-Sheet 1

INVENTOR.
FRITZ A. GUERTH

BY Howard J. Murray, Jr. AGENT
George J. Rubens
ATTORNEY

PULSE GENERATING APPARATUS
Filed Jan. 30, 1963 2 Sheets-Sheet 2
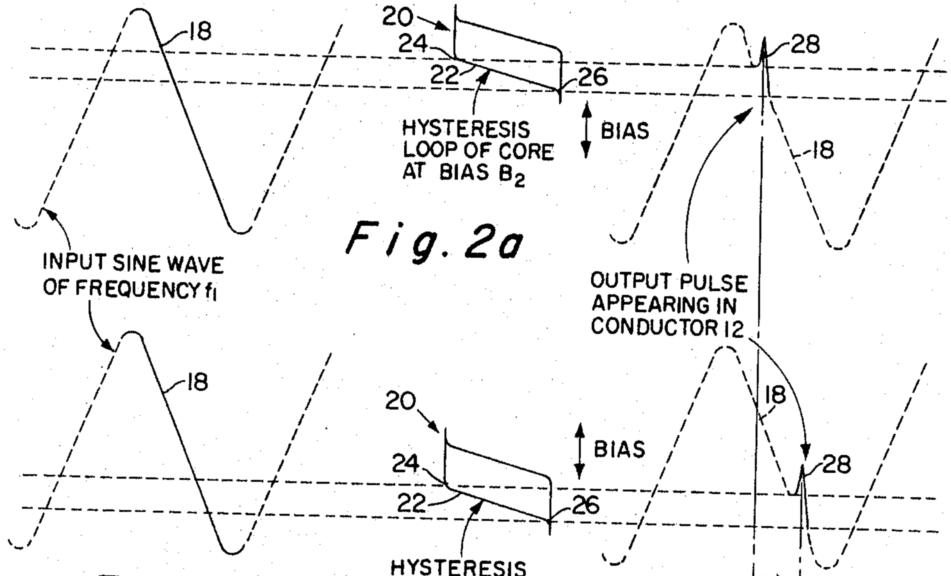
Fig. 2a
Fig. 2b
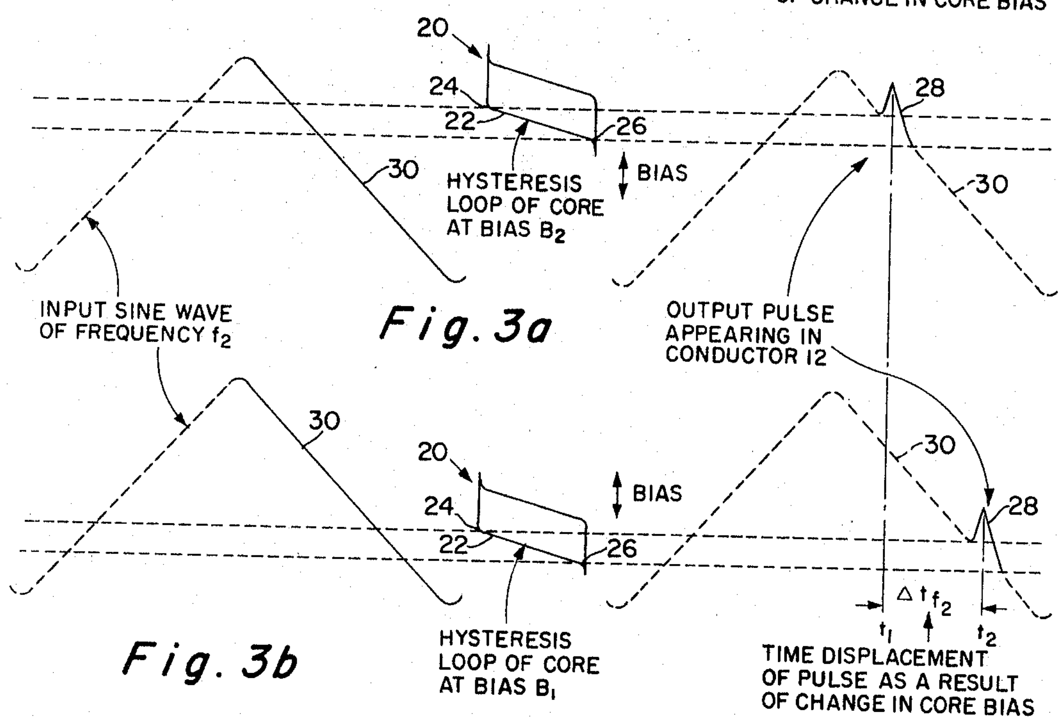
Fig. 3a
Fig. 3b
INVENTOR
FRITZ A. GUERTH
BY Howard J. Murray, Jr. AGENT
George J. Rubens
ATTORNEY 3,317,742
Patented May 2, 1967

3,317,742
PULSE GENERATING APPARATUS

Fritz A. Guerth, 50 Lori Road, Camarillo, Calif. 93010

Filed Jan. 30, 1963, Ser. No. 255,136
11 Claims. (Cl. 307—88)

The invention described herein may be manufactured and used by or for the Government of the United States of America for governmental purposes without the payment of any royalties thereon or therefor.

The present invention relates to the generation of pulses capable of representing information in digital form and which can be recorded on magnetic tape for subsequent utilization or, alternatively, stored in serial form in some suitable type of memory matrix.

When data in digital form is recorded on magnetic tape, information is represented by the location of the respective data bits with respect to a fixed reference. Assuming a known or predetermined relative positional displacement between the writing instrument (the recording head) and the writing medium (the tape), then pulses corresponding to the individual bits of data must be generated and recorded at the expiration of extremely accurate time intervals the duration of which is a function of the intelligence represented thereby. For example, if the basic time interval is designated by $\Delta t$, then the numeral one (in the standard digital code) can be represented by a pulse generated at the instant $cx1\Delta t$, the numeral two by $cx2\Delta t$, the numeral four by $cx3\Delta t$, etc. It is with the generation of such pulses that the present concept is concerned.

It has been found that a pulse can be developed at the end of a predetermined period of time by properly choosing the characteristics of a ferromagnetic core to which a periodic reference or time-base wave is applied. Such a core is known to possess the property of hysteresis, which may be graphically depicted by a loop the area of which is a measure of the energy loss of the material per cycle in an alternating magnetic field. This hysteresis, or $B/H$, loop has a rising portion which is nearly vertical in ferromagnetic materials having high differential permeability. In other words, a core of this nature saturates rapidly and the rate of change of flux is very high.

During the period when the flux in the core is rapidly changing (that is, during the time-duration of the rising portion of the hysteresis loop) a pulse of energy is developed in any conductor within the electromagnetic field of the core. The action is in effect one of differentiation, and, the more nearly vertical the rising loop portion, the sharper the developed pulse will be and the greater its amplitude. The time instant when such pulse generation occurs depends upon (1) the physical characteristics of the core, (2) the material of which it is composed, and (3) the bias, if any, applied thereto. Consequently, with a common sine or triangular wave as a base or reference, pulses having desired time-spacings can be generated by employing cores of different sizes, or, alternatively, by utilizing similar-size cores to which different amounts of bias are respectively applied. In effect, therefore, each core unit serves to provide the output pulse generated thereby with an amount of time delay (with respect to the reference wave input) determined by the particular core characteristics mentioned above. Since the cores per se are extremely simple in design and readily fabricated by inexpensive equipment, the concept herein disclosed is especially adaptable to computer techniques or to the storage of intelligence in a serial form capable of rapid read-out.

It is a feature of the invention that pulses are produced which bear a desired time relationship to a cyclically-recurring input wave by apparatus which includes a member composed of ferromagnetic material having a hysteresis characteristic of substantially rectangular configuration, means for inductively saturating the member in accordance with variations in the input wave and at the repetition frequency thereof so that the electro-magnetic field surrounding the member will rise to relatively high value during each saturating interval, and means for detecting this rise in electro-magnetic field intensity. Together with this apparatus, there may or may not be employed means for supplying a supplemental inductive force of constant strength to the member to partially magnetize the latter and hence vary the time instant at which such rise in electro-magnetic field intensity occurs with respect to each cycle of the input wave.

One object of the present invention, therefore, is to provide an improved and simplified apparatus for developing pulses at desired instants of time.

Another object of the invention is to provide an improved form of pulse-generating apparatus in which use is made of the substantially rectangular hysteresis characteristic of a mass of ferromagnetic material.

A further object of the invention is to provide an element composed of ferromagnetic material which is periodically saturated at regularly-recurring intervals of time, and to vary the time instants at which such periodic saturation occurs by supplying a predetermined bias to such element.

Other objects and many of the attendant advantages of this invention will be readily appreciated as the same becomes better understood by reference to the following detailed description when considered in connection with the accompanying drawings wherein:

FIG. 1 is a perspective view, partially broken away, of one form of pulse-generating device designed in accordance with the principles of the present invention;

FIGS. 2*a*, 2*b*, 3*a* and 3*b* are graphs illustrating the manner in which pulses are developed by the device of FIG. 1 and also the manner in which a change in applied bias can shift the time instant at which such pulses are produced;

Figure 6:
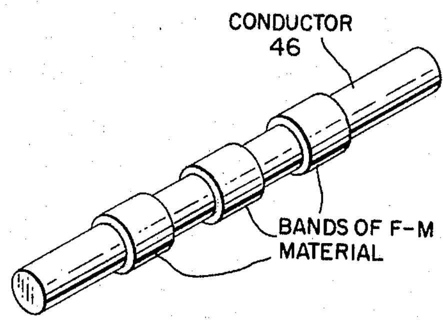
Figure 7:
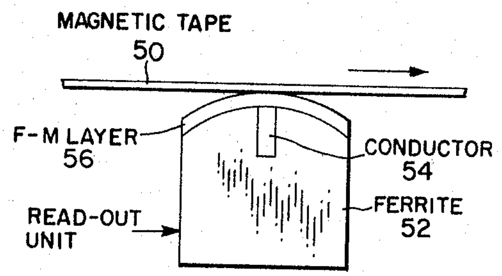

FIG. 6 is a still further form of pulse-generating unit in which a plurality of bands of ferromagnetic materials are disposed to encircle a conductor and are located in spaced-apart relationship therealong; and FIG. 7 is an illustration of one manner in which the principles of the present invention may be embodied in a unit designed to read out information from a memory-storage device such as a magnetic tape.

Figure 1:
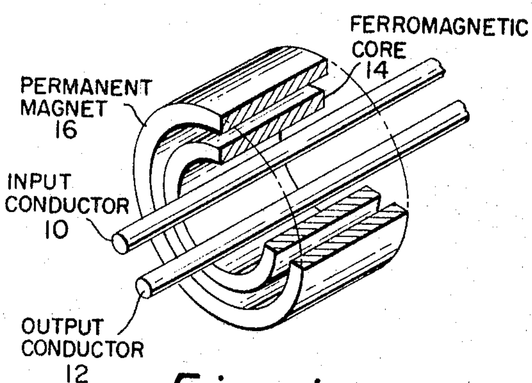

Referring now to the showing of FIG. 1 of the drawings, there is set forth an input conductor 10 to which is applied a cyclically-recurring wave (preferably of either sine-wave configuration or of triangular shape) from a suitable source (not shown). Such a wave will be discussed in greater detail in connection with FIG. 2, and it is only necessary to recognize at this time that the wave possesses a gradually sloping portion which varies substantially constantly as a function of time. Disposed in essentially parallel relationship with conductor 10, but electrically separated therefrom, is an output conductor 12. Encircling both conductors 10 and 12 is a member 14 of annular configuration and composed of ferromagnetic material having a high differential permeability. Examples of materials which are suitable for use in the device of FIG. 1 are metals of the iron group, nickel, cobalt, and certain alloys of these materials. Encircling the annular ferromagnetic member or core 14 is a permanent magnet 16 also of annular configuration and of a diameter greater than that of the core 14. As shown in FIG. 1, the two annular elements 14 and 16 are disposed in essentially coaxial relationship.

The output of a ferromagnetic core of the type under consideration may be expressed by the following formula:

$$e=N\frac{d\phi}{dt}10^{-8}$$

where $$\phi=BA$$
$$\phi=H\mu A$$
$$\phi=\frac{F}{l}\mu A$$
$$\phi=0.4\pi NI\mu\frac{A}{l}$$

N—number of windings
$\phi$—magnetic flux in maxwells
B—induction in gausses
A—area in cm.²
H—magn. field intensity oersteds
$\mu$—permeability
F—magnetomotive force gilberts
$l$—path length in cm.

From the above formula it can be seen that the output can be changed by (1) modifying the physical characteristic of the core ($A/l$), (2) changing the magnetic properties of the core by fabricating it from different material ($\mu$), (3) magnetically or electrically biasing the core (changing the valve NI). Consequently, it will be recognized that cores of different sizes will yield different outputs, and, furthermore, cores of identical size can also be made to yield diffierent outputs by supplying thereto a selected amount of biasing energy. It is with these basic characteristics of a magnetic core that the present invention is concerned.

Referring to FIG. 2 will explain in part one operating feature of the instant disclosure. As a wave 18 of constant frequency $f_1$ is applied to the input conductor 10 of FIG. 1, electromagnetic flux will be induced in the ferromagnetic core 14, and if the input wave 18 is of sufficient amplitude, the core 14 will become saturated. Such saturation will take place in a manner determined by the hysteresis characteristic of the core as depicted by the loop 20 in FIG. 2. This hysteresis loop, as illustrated, includes a sharply rising portion 22 during which time the flux in the core is undergoing a rapid change. It is desirable in accordance with the present invention that the rising portion of the hysteresis loop 20 be essentially vertical, since this will result in improved operation of the disclosed apparatus. In FIGS. 2 and 3 of the drawings the loop 20 has been illustrated as being other than strictly retangular for convenience of description and to more clearly bring out the results obtained during operation.

While flux is induced in the core 14 during each cycle of the input wave 18, substantially no change in the value of this flux occurs within the core until a point 24 on the hysteresis loop 20 is reached. At this point 24, however, the characteristics of the core material are such that a very rapid flux change takes place, as represented by the sharply rising curve portion 22. This continues until a further point 26 is reached, at which point the energy rise ceases and no further change in flux occurs. The steeper the slope of the line 22 the more rapid will be this flux change, and the shorter the time interval required for its completion.

During the period that the core 14 is saturating in the manner just described, the electromagnetic field surrounding the core increases in intensity. This field variation will induce a voltage in any conductor lying therewithin, such as the output conductor 12 of FIG. 1. Illustrated graphically, the energy intercepted by the conductor 12 during the time when saturation of core 14 is taking place will be in the form of a pulse 28.

FIG. 2*a* illustrates results obtained without considering the presence of the permanent magnet 16 of FIG. 1 and assuming that no effect is caused thereby. In other words, the showing of FIG. 2*a* is that which is achieved at a time when the permanent magnet 16 of FIG. 1 is completely absent from the assembly, and no flux is induced in the core 14 except that which results from energization of conductor 10 in the manner just described. FIG. 2*a* therefore may be considered as a description of the operation of the assembly of FIG. 1 in a completely unbiased condition. If it now be assumed that the assembly incorporates a permanent magnet such as identified by the reference numeral 16, such element will induce a constant flux in the core 14 which does not vary with respect to time. Expressed differently, the element 16 is formed of hard magnetic material which is magnetized in such a way as to produce a constant bias in the core 14.

FIG. 2*b* shows the effect of this bias provided by magnet 16 insofar as the operation of the device of FIG. 1 is concerned. As illustrated, the effect of the bias is to shift the position of the hysteresis loop 20, so that the point 24 has its location changed time-wise with respect to a reference point on the input sine wave 18. In FIG. 2*b* this change is graphically illustrated by a downward displacement of the hysteresis loop 20 so that the initiation of rapid flux change at point 24 occurs at a earlier time instant on the input wave 18 inasmuch as less energy is required therefrom to reach such point.

FIG. 2*b* shows how the output pulse 28 occurs at a different location on the slope of wave 18 than is the case in FIG. 2*a*, with the time displacement between the two pulses 28 in FIGS. 2*a* and *b* being designated by the interval $\Delta tf_1$. Obviously the duration of this incremental time period $\Delta tf_1$ is a function of the amount of bias supplied by the magnet 16, and, consequently, the strength of magnet 16 may be predetermined to result in any desired interval within the capabilities of the apparatus. Replacing the magnet 16 and core 14 as a unit with a differently biased unit having greater or lesser strength is obviously readily achieved, so that various amounts of time delay with respect to the input wave 18 are available to represent any digital intelligence with which the device of FIG. 1 is designed to operate.

It will be noted that the waveforms of FIG. 2 (as well as of FIG. 3 to be described below) have been somewhat idealized in the drawing for the sake of simplicity of illustration. It should be emphasized however, that it is not necessary that either sine waves or triangular waves be employed to produce a saturation of the core 14, since any regularly-recurring voltage variation having a waveform which remains constant from cycle to cycle may be utilized for the purpose described. However, it is desirable that the slope of the leading and trailing edges of the waveform contain an appreciable horizontal component so that any time displacement of the pulses 28 will be discernible in output conductor 12.

Referring now to FIG. 3 of the drawings, there is brought out the manner in which a change in frequency of the input wave 18 brings about a change in the time displacement $\Delta t$ of the output pulses. An input wave 30 is illustrated which has a frequency $f_2$ less than that of the wave 18 in FIG. 2. Consequently, the leading and trailing edges of this wave 30 form a greater angle with the vertical than do the corresponding edges of wave 18. As a result, the output pulse 28 in FIG. 3*a* occurs at a certain time $t_1$ when no bias is applied to the core 14. However, when a bias is present (such as may be provided by the magnet 16) then the output pulse 28 occurs at a time $t_2$, and, as will be noted in FIG. 3*b*, the time displacement $\Delta tf_2$ therebetween is considerably greater than the time displacement $\Delta tf_1$ obtained by supplying an identical bias to the core 14 in the showing of FIG.

2. From this example, it may be concluded that the lower the excitation frequency, the higher will be the sensitivity of the device of FIG. 1, since a greater output pulse displacement is obtained for the same biasing energy. Expressed in simple terms, the bias supplied by magnet 16 serves to shift the output pulse 28 along the slope of the excitation wave, and this movement, in effect, is a time shift insofar as the position of the pulse with respect to the excitation wave is concerned.

Figure 4:
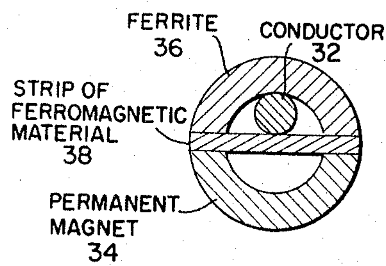
FIG. 4 is a cross-sectional view of a modification of the device of FIG. 1.

In FIG. 4 there is illustrated another form of biased core which may be substituted for the arrangement of FIG. 1. In FIG. 4 the output conductor 12 is eliminated, and only a single conductor 32 employed which serves both to supply the excitation voltage and also to pick up the developed pulses 28 which are in effect superimposed thereupon. As will be seen in the drawing (where the various elements are shown in cross section) the conductor 32 lies within the central opening of a pulse-generating unit of annular configuration, this unit being composed of a semi-annular permanent magnet 34 and a semi-annular element 36 composed of some such material as a ferrite. Each of the elements 34 and 36 extends over an arc of approximately 180°, and the elements are disposed so that the ends thereof are contiguous to one another. However, interposed between these contiguous ends of the elements 34 and 36 is a strip 38 of ferromagnetic material. This strip 38, therefore, may be said to extend diametrically across the annulus made up of the elements 34 and 36.

As in the case of the structure of FIG. 1, the device of FIG. 4 is so designed that the strip 38 of ferromagnetic material is periodically saturated by a voltage variation appearing in conductor 32. The permanent magnet 34 serves to induce a constant flux in member 38 which biases the latter in the same manner that the magnet 16 of FIG. 1 biases the core 14. The ferrite element 36 serves to complete the flux path between the ends of magnet 34, as otherwise the magnetic circuit would be open. Expressed differently, the ferrite number 36 may be said to comprise a magnetic shunt.

Figure 5:
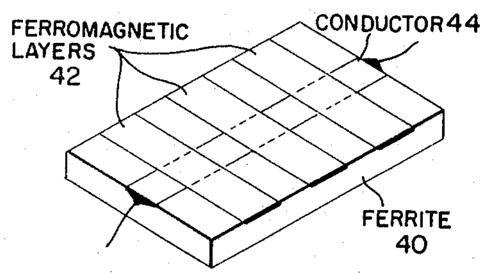
FIG. 5 is a perspective view of a pulse-generating unit embodying the principles of the present invention, and in which the respective ferromagnetic elements are applied to the unit by a metal evaporation process.

FIG. 5 illustrates the manner in which more than one output pulse may be generated during each input cycle, with each pulse so generated having a different time relationship with respect to the input wave. To achieve this objective, a block 40 of some non-conductive material such as ferrite is configured to have at least one substantially planar surface. On this planar surface is laid down a plurality of strips 42 of ferromagnetic material. These strips 42 may be applied to the surface of the ferrite block 40 by a metal evaporation process which yields extremely thin layers of the material securely bonded to the surface of the ferrite. As shown in the drawing, these strips or layers 42 are disposed in spaced-apart parallel relationship.

Prior to the deposition of the layers 42, a single conductor 44 is laid down on the planar surface of block 40 by a similar process and in such a fashion that the conductor 44 will extend transversely to each of the strips 42 which are to be subsequently applied. When the unit has been so fabricated, its electrical characteristics are such that the outut pulses having different time relationships are obtainable by varying the thickness of the respective strips 42, so that saturation thereof by a varying voltage applied to conductor 44 will occur at different instants of time. To obtain optimum results, it has been found that the material of which conductor 44 is composed should preferably be some such substance as gold.

A particularly desirable method of practicing the present concept is by means of a device such as shown in FIG. 6 of the drawings. Illustrated therein is a single conductor 46 which is circled by a number of bands 48 of ferromagnetic material. These bands 48 may be in the form of collars or beads which can be slipped over the conductor and which will saturate at different time instants according to some physical characteristic thereof, such, for example, as their radial thickness. Consequently, by merely fabricating a bead or a collar of greater mass, an output pulse may be derived having an increased time delay with respect to a corresponding pulse produced by a collar or bead of less radial thickness but otherwise identical configuration.

FIG. 7 brings out the manner in which the present concept may be utilized in a device for reading out data which has been previously recorded in digital form on a magnetic tape 50. As shown, a block of ferrite 52 has embedded therein a conductor 54, and one surface of the block possesses a convex configuration. Upon this convex surface is applied a layer 56 of ferromagnetic material, the magnetic tape 50 being arranged to frictionally engage a point on this convex surface. If now a voltage variation be applied to conductor 54 of the type discussed in FIGS. 2 and 3, then the various magnetic impressions on tape 50, in passing over the layer 56, will serve to provide a bias whenever a magnetized portion of the tape overlies the layer 56, thus indicating data position. The varying bias thus developed will shift the position of the output pulses picked up by conductor 54, and the time shift of these pulses will bear a definite relationship to the variations in spacing of the data bits on tape 50. Consequently, the unit of FIG. 7 is suitable for reading out these magnetic impressions, which are of course representative of the intelligence previously recorded on the tape.

Obviously many modifications and variations of the present invention are possible in the light of the above teachings. It is therefore to be understood that within the scope of the appended claims the invention may be practiced otherwise than as specifically described.

I claim:

1. Apparatus for producing pulses which bear a desired time relationship to a cyclically-recurring input wave having leading and trailing edges the slope of which contains an appreciable horizontal component, and apparatus comprising:

(a) a magnetizable member composed of ferromagnetic material and characterized by the possession of a hysteresis loop having a rising portion which extends substantially vertically;

(b) a conductor to which said cyclically-recurring input wave is applied;

(c) said magnetizable member lying in the electromagnetic field of flux established around said conductor during the cyclic recurrence of said input wave;

(d) said input wave being of sufficient amplitude to induce periodic saturation of said member within a time period the duration of which is determined by the amount that the rising portion of the said hysteresis loop departs from the vertical;

(e) whereby the rapid change of flux in said member during saturation thereof will create a corresponding change in electromagnetic field intensity in the region immediately surrounding said member;

(f) means for biasing said magnetizable member so as to partially saturate the latter and hence shift, timewise along the slope of said input wave, the period during which said member is periodically saturated by said input wave; and (g) means for detecting such change in field intensity in the form of an output pulse the width of which is determined by the duration of the said time period and the amplitude of which is an inverse function of such duration.

2. Apparatus according to claim 1 in which the said magnetizable member comprises a core of annular configuration, the said conductor passing therethrough.

3. Apparatus according to claim 2 in which the means for detecting a change in field intensity in the region immediately surrounding said magnetizable member comprises a second conductor also passing through said annular core and out of direct electrical contact with said first-mentioned conductor.

4. Apparatus for producing pulses each of which bears a preselected time relationship to a cyclically-recurring input wave having leading and trailing edges the slope of which contains an appreciable horizontal component, said apparatus comprising:

(a) a plurality of magnetizable elements composed of ferromagnetic material, each of which is characterized by the possession of a hysteresis loop having a rising portion which extends substantially vertically; and (b) a conductor to which said cyclically-recurring input wave is applied;

(c) each of said magnetizable elements lying in the electromagnetic field of flux established around said conductor during the cyclic recurrence of said input wave;

(d) said input wave being of sufficient amplitude to induce periodic saturation of each of said elements within respective time periods the duration of which is determined by the amount that the rising portion of its respective hysteresis loop departs from the vertical;

(e) whereby the rapid change of flux in each of said elements during saturation thereof will create a corresponding change in electromagnetic field intensity in the region immediately surrounding such element;

(f) means for biasing each of said elements so as to partially saturate each element and hence shift, timewise along the slope of said input wave, the period during which each element is periodically saturated by said input wave;

(g) such change in field intensity being detectable as an output pulse the width of which is determined by the duration of the respective time period and the amplitude of which is an inverse function of such duration.

5. Apparatus according to claim 4 in which said plurality of magnetizable elements are in the form of narrow strips lying in spaced-apart parallel relationship so as to define a planar surface, said conductor being co-planar with said strips and extending normal thereto so as to electrically contact each strip.

6. Apparatus according to claim 5, further comprising an electrically non-conductive base member composed of ceramic ferromagnetic material having at least one planar surface serving to support said conductor and said plurality of magnetizable elements.

7. Apparatus according to claim 4 in which said conductor is in the form of a wire, and in which said plurality of magnetizable elements are in the form of annular beads encircling said wire and spaced apart axially therealong.

8. Apparatus for producing pulses which bear a desired time relationship to a cyclically-recurring input wave, said apparatus comprising:

(a) a member composed of ferromagnetic material and having a hysteresis characteristic which contains a rising portion extending substantially vertically;

(b) means for inductively saturating said member in accordance with variations in the amplitude of said input wave and at the repetition frequency thereof, whereby the electromagnetic field surrounding said member will rise to a relatively high value during each saturating interval;

(c) means for detecting such rise in electromagnetic field intensity; and (d) means for supplying a supplemental inductive force of constant intensity to said member to partially saturate the latter and hence vary the time instant at which such rise in electromagnetic field intensity occurs with respect to each cycle of said input wave.

9. Apparatus according to claim 8 in which said means for supplying a supplemental inductive force of constant intensity to said member comprises a permanent magnet so located that said member lies in the flux field produced thereby, the strength of said permanent magnet being so chosen as to produce a desired partial saturation of said member.

10. Apparatus according to claim 2, further comprising a permanent magnet of annular configuration positioned to be coaxial with said annular core, said permanent magnet being of greater diameter than the diameter of said core and disposed so as to encircle the latter.

11. Pulse-generating apparatus comprising:

(a) a semi-annular permanent magnet extending over an arc of approximately 180°;

(b) a semi-annular member composed of a ferrite also extending over an arc of approximately 180° and with the ends thereof proximate to the ends of said semi-annular permanent magnet so as to define an annulus, with the flux path of said magnet being completed through said ferrite;

(c) a strip of ferromagnetic material extending diametrically across the annulus formed by said magnet and said ferrite and lying intermediate the respective ends thereof so that the two semi-annular members are out of direct physical contact with one another;

(d) and a conductor extending through said annulus and lying essentially normal to the plane of the latter.

References Cited by the Examiner

UNITED STATES PATENTS

| | | | |
|---|---|---|---|
| 2,781,503 | 2/1957 | Saunders | 340—174 |
| 2,792,563 | 5/1957 | Rajchman | 340—174 |
| 3,157,866 | 11/1964 | Lien | 340—174 |
| 3,209,333 | 9/1965 | Russell | 340—174 |
| 3,275,842 | 9/1966 | Baycura | 307—88 |

BERNARD KONICK, *Primary Examiner.*

S. M. URYNOWICZ, *Assistant Examiner.*